US012264712B2

(12) United States Patent
Tarandek et al.

(10) Patent No.: US 12,264,712 B2
(45) Date of Patent: Apr. 1, 2025

(54) FRICTION BRAKE SYSTEM FOR A VEHICLE

(71) Applicant: HL MANDO CORPORATION, Gyeonggi-do (KR)

(72) Inventors: Kristijan Tarandek, Neu-Isenburg (DE); Hans-Jörg Feigel, Rosbach (DE)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 18/401,345

(22) Filed: Dec. 30, 2023

(65) Prior Publication Data
US 2024/0133434 A1    Apr. 25, 2024

Related U.S. Application Data

(63) Continuation of application No. 17/155,062, filed on Jan. 21, 2021, now abandoned.

(30) Foreign Application Priority Data

Jan. 22, 2020  (DE) .......................... 102020200765.9

(51) Int. Cl.
*F16D 55/08* (2006.01)
*F16D 55/226* (2006.01)
(Continued)

(52) U.S. Cl.
CPC ..... *F16D 55/2262* (2013.01); *F16D 65/0068* (2013.01); *F16D 65/18* (2013.01);
(Continued)

(58) Field of Classification Search
CPC .. F16D 55/2262; F16D 65/0068; F16D 65/18; F16D 2055/0016; F16D 2121/24; F16D 2125/36; F16D 2125/50
See application file for complete search history.

(56) References Cited

U.S. PATENT DOCUMENTS 6,749,044 B2 *  6/2004  Boisseau ................. F16D 65/18
                                                      188/72.7
6,761,252 B1    7/2004  Weiler et al.
(Continued)

OTHER PUBLICATIONS

Office Action dated Jun. 7, 2023 for U.S. Appl. No. 17/155,062 (now published as U.S. 2021/0222746).
(Continued)

*Primary Examiner* — Nicholas J Lane
(74) *Attorney, Agent, or Firm* — WOMBLE BOND DICKINSON (US) LLP

(57) ABSTRACT

The present application relates to a friction brake system (1) for a vehicle. The friction brake system (1) comprises a braking member (12) connectable to first and second brake pads and configured for pressing the first and second brake pads against a friction surface. The system (1) further comprises a transmission unit (2) configured for converting a rotary motion generated by an electric motor (30) into a braking motion of the braking member (12). The transmission unit (2) comprises a ball-in-ramp assembly (3) having a first plate (9) with at least one groove (23), a second plate (10) with at least one groove (22) facing the groove (23) of the first plate (9), and at least one ball (11) arranged between the first plate (9) and the second plate (10). The ball (11) is retained by the groove (23) of the first plate (9) and the groove (22) of the second plate (10). Further, the ball-in-ramp (3) assembly is configured to convert a rotary motion of the first plate (9) into a translational motion of the second plate (10) with respect to the first plate (9). The first plate (9) is configured to be rotated by the electric motor (30). Further, at least one of the first plate (9) and the second plate (10) is mechanically coupled with the braking member (12). The first plate (9) is rotatably supported by a brake bolt bracket (16) coupled to a braking bolt (13), and the second plate (10) is operably connected to a caliper housing bolt (14) connected with a caliper housing (33) such that the caliper housing (33) and the braking bolt (14) are configured to press the first and second brake pads against opposing surfaces of a brake disc when the braking member (12) executes the braking motion.

14 Claims, 8 Drawing Sheets

Figure 1:
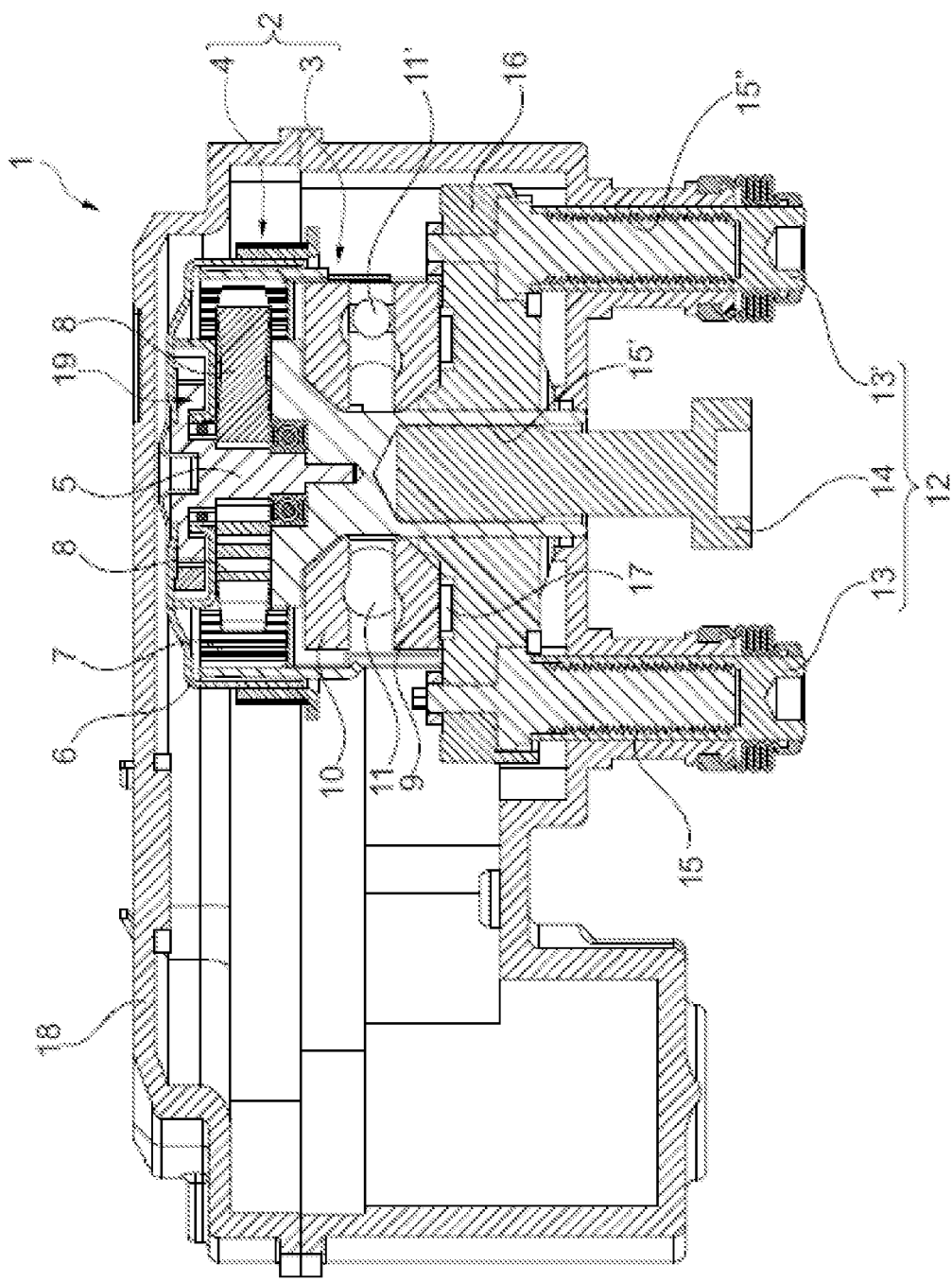

(51) Int. Cl.
  *F16D 65/00* (2006.01)
  *F16D 65/18* (2006.01)
  *F16D 55/00* (2006.01)
  *F16D 121/24* (2012.01)
  *F16D 125/36* (2012.01)
  *F16D 125/50* (2012.01)

(52) U.S. Cl.
  CPC .. *F16D 2055/0016* (2013.01); *F16D 2121/24* (2013.01); *F16D 2125/36* (2013.01); *F16D 2125/50* (2013.01)

(56) References Cited

U.S. PATENT DOCUMENTS

| | | | |
|---|---|---|---|
| 2002/0166734 A1 | 11/2002 | Lumpkin et al. | |
| 2010/0243387 A1 | 9/2010 | Vollert et al. | |
| 2012/0261220 A1* | 10/2012 | Sakashita | F16D 65/18 188/72.6 |
| 2012/0292137 A1* | 11/2012 | Yoshikawa | F16D 65/567 188/71.7 |
| 2013/0327601 A1 | 12/2013 | Masuda et al. | |
| 2015/0323026 A1* | 11/2015 | Yasui | F16H 25/186 74/89 |
| 2016/0333951 A1 | 11/2016 | Lee | |
| 2018/0372168 A1* | 12/2018 | Beigang | F16D 23/12 |
| 2019/0118790 A1 | 4/2019 | Severinsson | |
| 2021/0215213 A1* | 7/2021 | Liao | F16D 65/567 |
| 2021/0222746 A1 | 7/2021 | Tarandek et al. | |
| 2021/0301889 A1 | 9/2021 | Gerber et al. | |
| 2021/0310530 A1 | 10/2021 | Tarandek et al. | |
| 2021/0310531 A1 | 10/2021 | Tarandek et al. | |
| 2022/0136567 A1 | 5/2022 | Willsch et al. | |

OTHER PUBLICATIONS

Advisory Action dated May 17, 2023 for U.S. Appl. No. 17/155,062 (now published as U.S. 2021/0222746).

Final Office Action dated Jan. 27, 2023 for U.S. Appl. No. 17/155,062 (now published as U.S. 2021/0222746).

Office Action dated Sep. 28, 2022 for U.S. Appl. No. 17/155,062 (now published as U.S. 2021/0222746).

* cited by examiner

FRICTION BRAKE SYSTEM FOR A VEHICLE

CROSS-REFERENCE TO RELATED APPLICATION

This application is a continuation of application Ser. No. 17/155,062, filed on Jan. 21, 2021, which claims the benefit of Deutches Patent Application No. 10 2020 200 765.9, filed on Jan. 22, 2020 in the Deutches Intellectual Property Office, the disclosure of which are incorporated herein by reference by their entireties.

DETAILED DESCRIPTION

The present application relates to a friction brake system for a vehicle, to a parking brake for a vehicle comprising the friction brake system, and to a service brake for a vehicle comprising the friction brake system. More precisely, the present application relates to a friction brake system comprising a braking member connectable to a at least one brake pad and configured for pressing the brake pad against a friction surface and further comprising a transmission unit configured for converting a rotary motion generated by an electric motor into a braking motion of the braking member.

Friction brakes of this kind, in particular electro-mechanically actuated wheel brakes, are known. For example, such types of brakes may be used as integrated park brakes or as service brakes. In order to achieve a braking motion with a sufficient clamping force in a certain time (e.g., TTL: time to lock) using an electro-mechanically actuated wheel brake, a certain motor power has to be provided. For example, with the use of a non-linear gear the required motor power can be reduced. The non-linear gear may be a knee-lever gear. However, such a type of gear is relatively spacious and difficult to integrate within a housing disposed adjacent the wheel brake. Therefore, there is a need for an inexpensive, robust and small alternative.

In view of the above-mentioned aspects, it is an object of the present application to provide an improved friction brake system for a vehicle. In particular, it is an object of the application to provide a friction brake system, which is compact, inexpensive and particularly robust. In addition, it is an object of the application to provide a parking brake and a service brake having these advantages.

This objective is achieved by a friction brake system for a vehicle comprising the features of independent claim 1. Optional further features and further developments will become apparent from the dependent claims and the detailed description in conjunction with the accompanying figures.

The proposed friction brake system for a vehicle comprises a braking member connectable to at least one brake pad and configured for pressing the brake pad against a friction surface. The friction surface may, e.g., be a surface of a brake disc, in particular of a wheel brake. The system further comprises a transmission unit configured for converting a rotary motion generated by an electric motor into a braking motion of the braking member. When the braking member executes the braking motion, typically the brake pad is pressed against the friction surface. The transmission unit comprises a ball-in-ramp assembly having a first plate with at least one groove, a second plate with at least one groove facing the groove of the first plate, and at least one ball arranged between the first plate and the second plate. The ball is retained by the groove of the first plate and the groove of the second plate. Further, the ball-in-ramp assembly is configured to convert a rotary motion of the first plate into a translational motion of the second plate with respect to the first plate. Thereby, an axial spacing between the first plate and the second plate may be changed. Typically, when a brake of the vehicle is applied, an axial spacing between the first plate and the second plate is increased to generate a braking motion that exerts a force on the friction surface. To release the brake, the axial spacing between the first plate and the second plate may be decreased. The first plate is configured to be rotated by the electric motor. Further, at least one of the first plate and the second plate is mechanically coupled with the braking member such that a rotation of the first plate causes the braking motion of the braking member. For example, at least one of the first plate and the second plate may be rigidly connected with the braking member.

The application further relates to a parking brake for a vehicle, the parking brake comprising the friction brake system as described above or below. The friction brake system may in this case be configured to keep the vehicle motionless when parked by pushing the brake pad against the friction surface.

In addition, the application relates to a service brake for a vehicle, the service brake comprising the friction brake system as described above or below. In this case, the friction brake system may be configured to reduce a rotational speed of a wheel by pushing the brake pad against the friction surface, e.g., for reducing a speed of a vehicle during driving operation of the vehicle.

A depth of the groove of at least one of the first plate and the second plate increases between a first portion and a second portion of the groove, in particular in a non-linear manner such that a path defined by the groove is steeper in the first portion than in the second portion. In a typical embodiment, the depth of the grooves of both the first and the second plate increases between the first portion and the second portion.

Because the path is steeper in the first portion, a particular angular momentum exerted by the electric motor is first converted into a comparatively large relative travel distance of the first and second plates and into a large travel distance of the brake pad, when the brake is initially applied. After the brake pad has travelled a particular distance, and in particular after contact of the brake pad with the friction surface has been made, the particular angular momentum is converted into a smaller relative travel distance of the brake pad. Therefore, a low gear ratio at ramp start is achieved by the proposed friction brake system. In this way, a sufficiently high clamping force can be obtained in a short time with a low required motor power.

To achieve these desired effects, it is particularly helpful to provide a guidance of the ball in a well-defined position on the paths defined by the grooves of the first and second plates. Therefore, the groove of the first plate and the groove of the second plate may each define a path having a radial component. The grooves and/or paths defined by the grooves may, in other words, be eccentric or non-concentric. Further, the ball may be held at an intersection point of the path defined by the groove of the first plate with the path defined by the groove of the second plate. In other words, the grooves may be shaped such that corresponding pairs of grooves of the first and second plates are configured to hold the ball at the intersecting point. In this way, the ball is reliably guided by the pair of grooves. Typically, a path of motion of the ball has a radial component. Another means for guidance of the ball, such as a cage, may not be required.

The first portion of the groove may be an outer portion, e.g., a portion of the groove which is disposed such that a spacing from the main axis of the ball-in-ramp assembly is larger. The main axis typically corresponds to an axis of rotation of the first plate. The second portion of the groove may be an inner portion, i.e., a portion disposed radially closer to the main axis. Typically, before the brake is applied the ball is arranged within the first portions of the grooves of the plates. When the brake is applied, the ball may move, in particular roll, toward the second portions of the grooves of the plates. When the brake is applied, the motion of the ball may have a component directed inward toward the main axis of the ball-in-ramp assembly.

In some embodiments, neighboring grooves of the first plate and/or of the second plate overlap at a circumferential position. In other words, the neighboring grooves of the first plate and/or of the second blade may have a circumferential overlap, i.e., portions of the neighboring grooves may extend to the same circumferential position. However, in this circumferential position the neighbouring grooves may have a different radial spacing from the main axis of the ball-in-ramp assembly. The circumferential overlap enables a longer path to be travelled by the ball without interfering with further balls and thereby enables the desired low gear ratio at ramp start.

In further embodiments, the grooves of the first plate and the grooves of the second plate have an identical shape at least in sections. The sections may be defined by sections travelled by the ball or balls during braking operation. In some embodiments, the grooves of the first and second plates are fully identical in shape.

The friction brake system may have a gear, in particular a planetary gear. The gear may be coupled with the first plate. The first plate may be configured to be rotated by the electric motor via the gear, e.g., the planetary gear. In some embodiments, the first plate is additionally or alternatively connectable to the motor via a toothed belt drive, in particular via the planetary gear. For example, the first plate may be rigidly coupled with a ring gear of the planetary gear.

The ball-in-ramp assembly may comprise at least three grooves, in particular at least five grooves of the first plate. Further, the ball-in-ramp assembly may comprise at least three, in particular at least five, grooves of the second plate. Correspondingly, the ball-in-ramp assembly may comprise at least three, in particular at least five, balls retained by pairs of the grooves of the first and second plates. Typically, each one of the balls is held by a pair of grooves, the pair comprising one groove of the first plate and one groove of the second plate. Any or all of the grooves of the first and/or second plate may have any or all of the features or characteristics described with respect to any groove above or below. The embodiment comprising at least three pairs of grooves and at least three balls provide a mechanically stable arrangement. The embodiment comprising at least five pairs of grooves and at least five balls enable a compact arrangement with a low installation height. These embodiments are particularly favourable in combination with the circumferential overlap of the neighbouring grooves, because thereby a long path to be travelled by the balls without interfering one another is achieved.

The friction brake system may have a housing. The motor and/or the ball-in-ramp arrangement may be disposed within the housing. In typical embodiments, the second plate is held such that it is not rotatable with respect to the housing. In this manner, the rotational motion of first plate is reliably converted into the translational displacement of the plates with respect to one another.

In typical embodiments, the braking member comprises a caliper housing and/or a braking bolt or actuation pin. The caliper housing may be connectable to a first brake pad. The braking bolt or actuation pin may be connectable to a second brake pad. The caliper housing and the braking bolt may each be coupled with one of the first plate and the second plate such that the caliper housing and the braking bolt are configured to press the first and second brake pads against opposing surfaces of a brake disc when the braking member executes the braking motion. Typically, when the braking motion is performed, the braking bolt and the caliper housing move in opposite directions. The caliper housing and the braking bolt may be held such that they execute a translational motion with respect to the housing when the braking member executes the braking motion. In addition, the first plate and the second plate may both move with respect to the housing upon application of the brake.

The first plate may be coupled with the caliper housing and the second plate may be coupled with the braking bolt. In other embodiments, the first plate is coupled with the braking bolt and the second plate is coupled with the caliper housing.

The friction brake system may further comprise an axial needle bearing. The axial needle bearing may support the first plate. In particular, the axial needle bearing may be arranged between the first plate and the caliper housing or between the first plate and the braking bolt. The axial needle bearing may be configured to transmit a translational motion from the first plate to the caliper housing or to the braking bolt.

Exemplary embodiments will be described in conjunction with the following figures.

Figure 2:
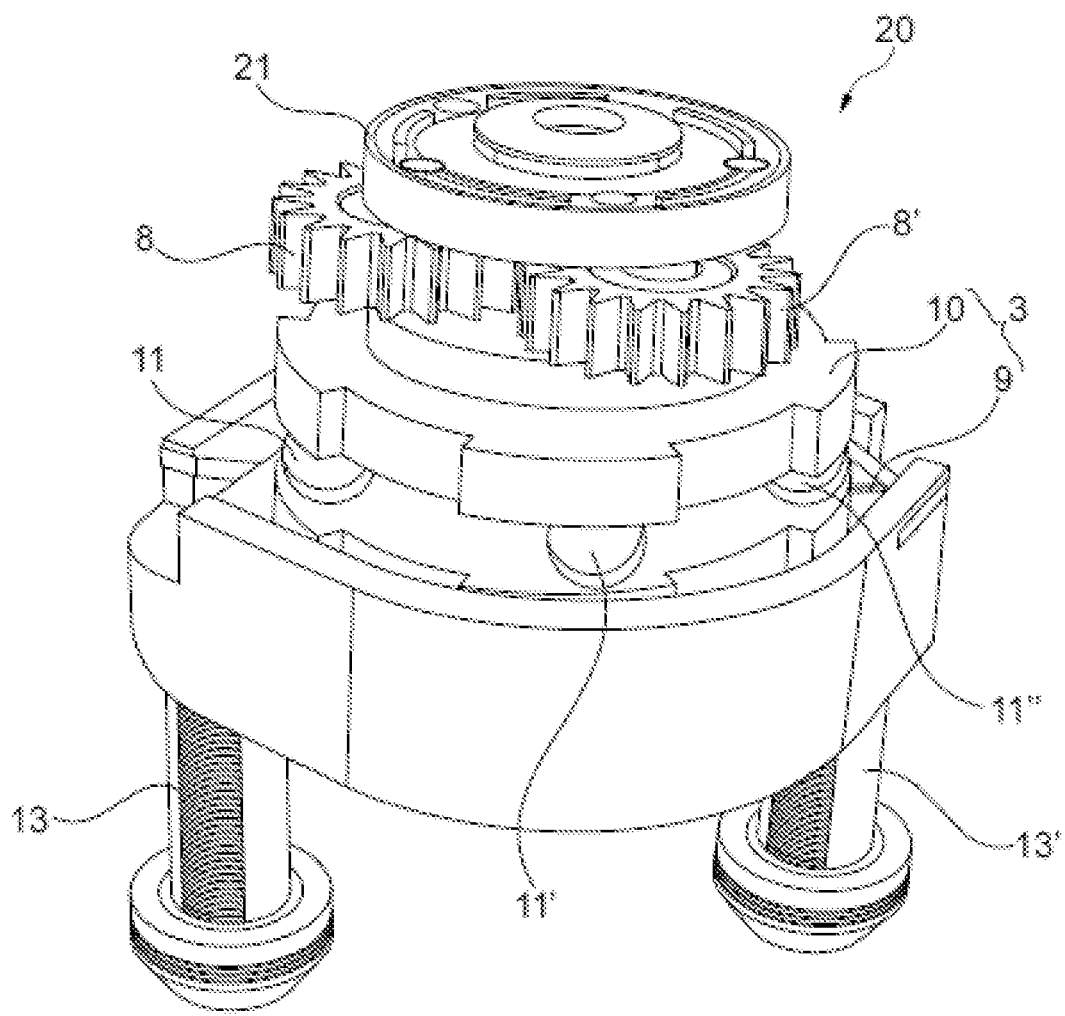
Figure 3:
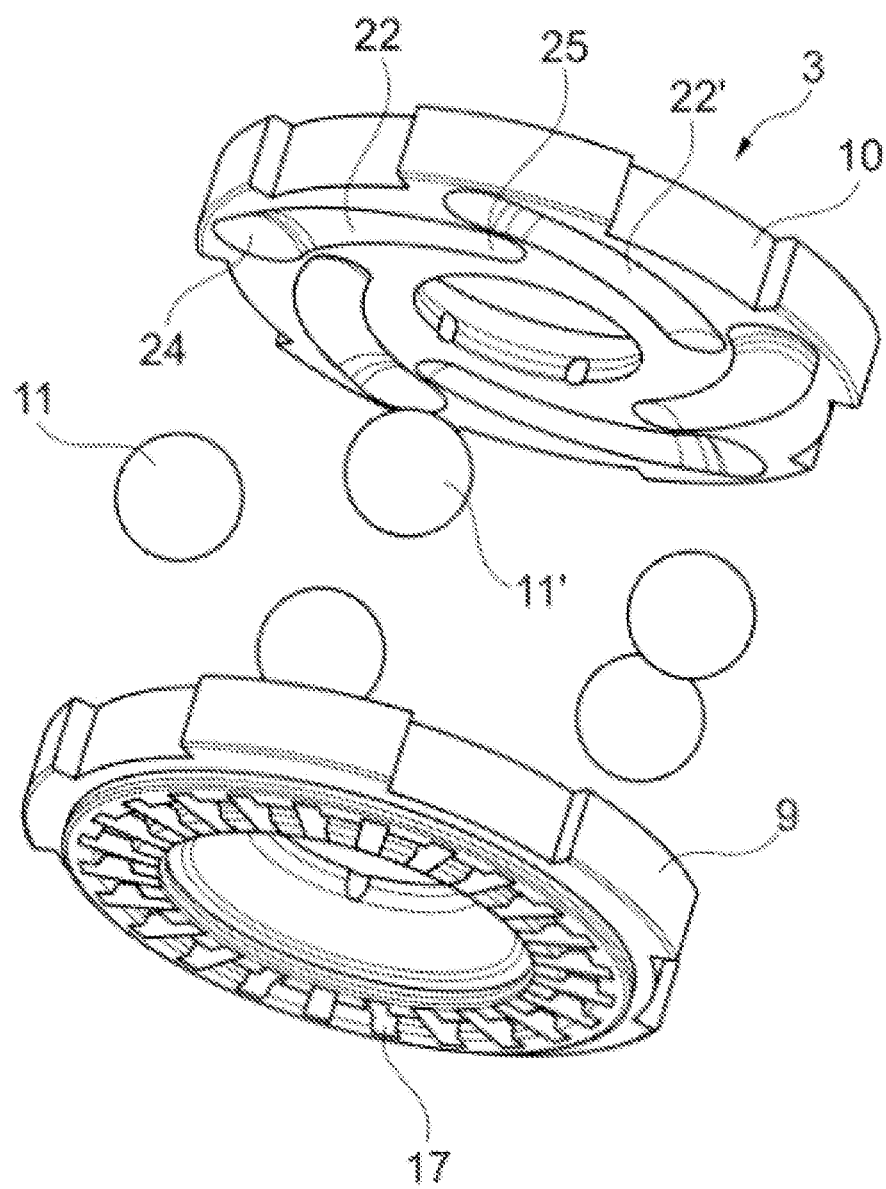
Figure 4:
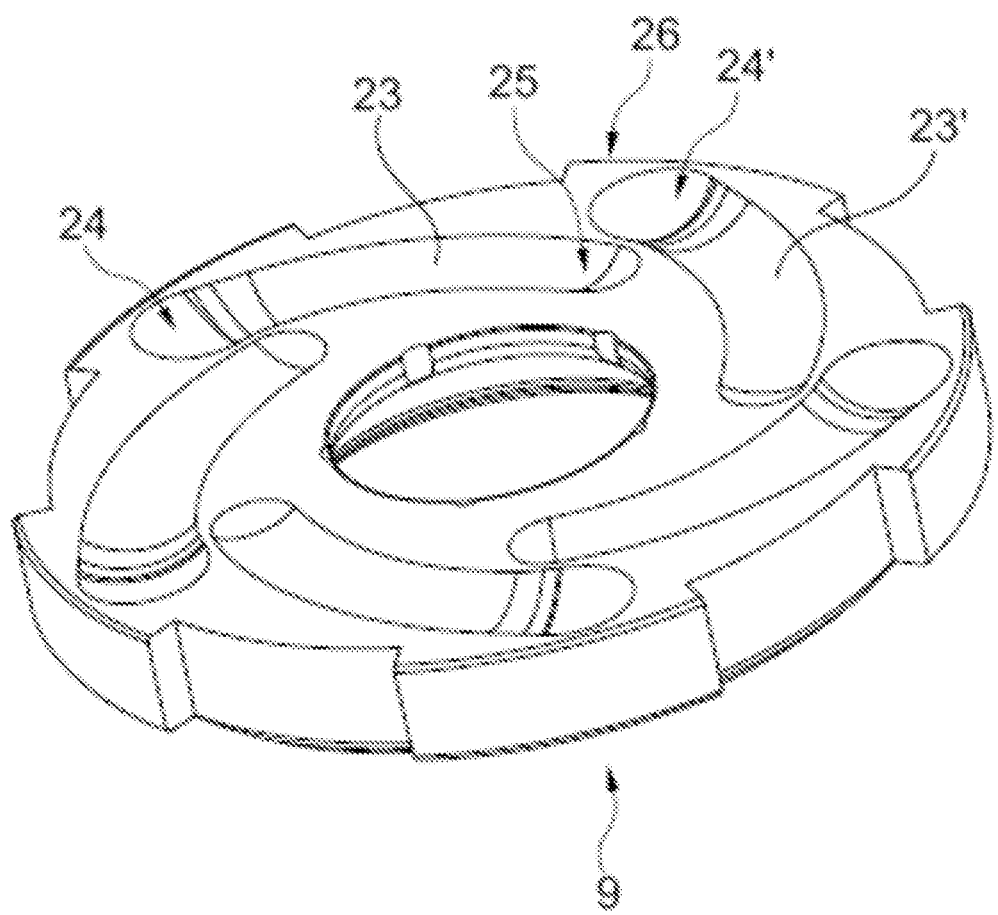
Figure 5A:
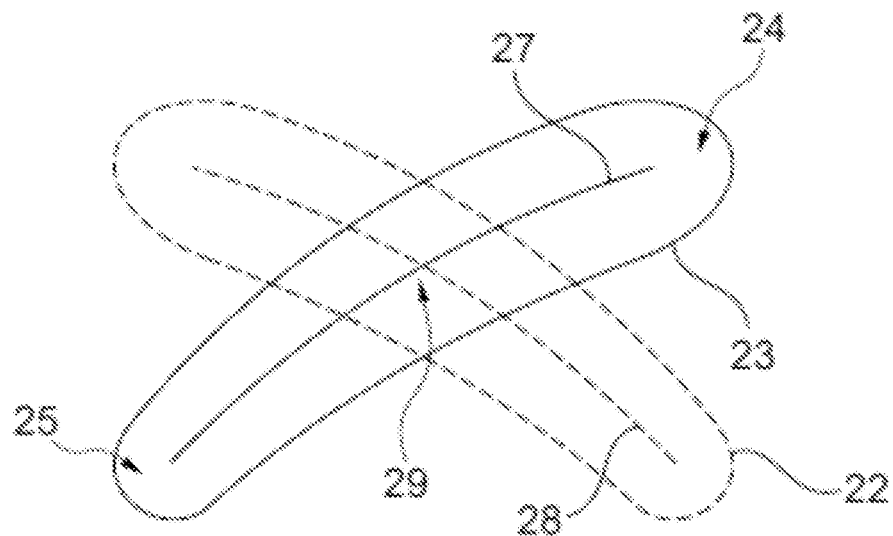
Figure 5B:
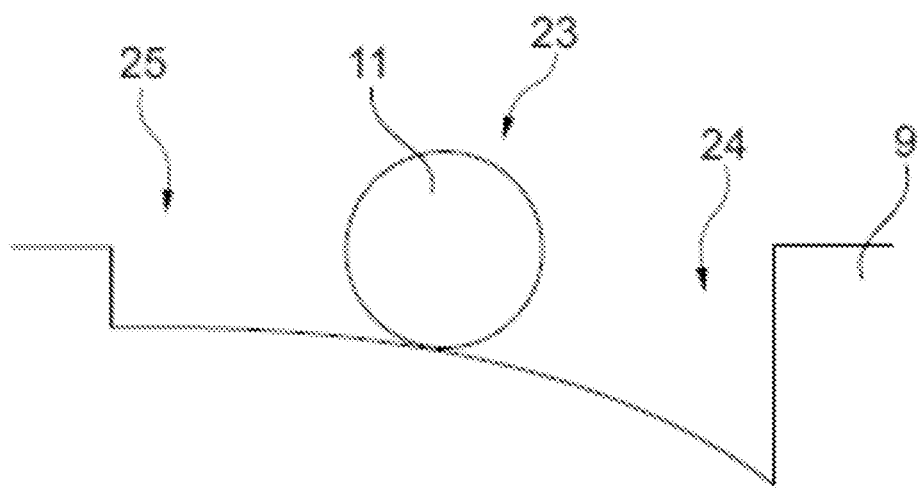
Figure 6:
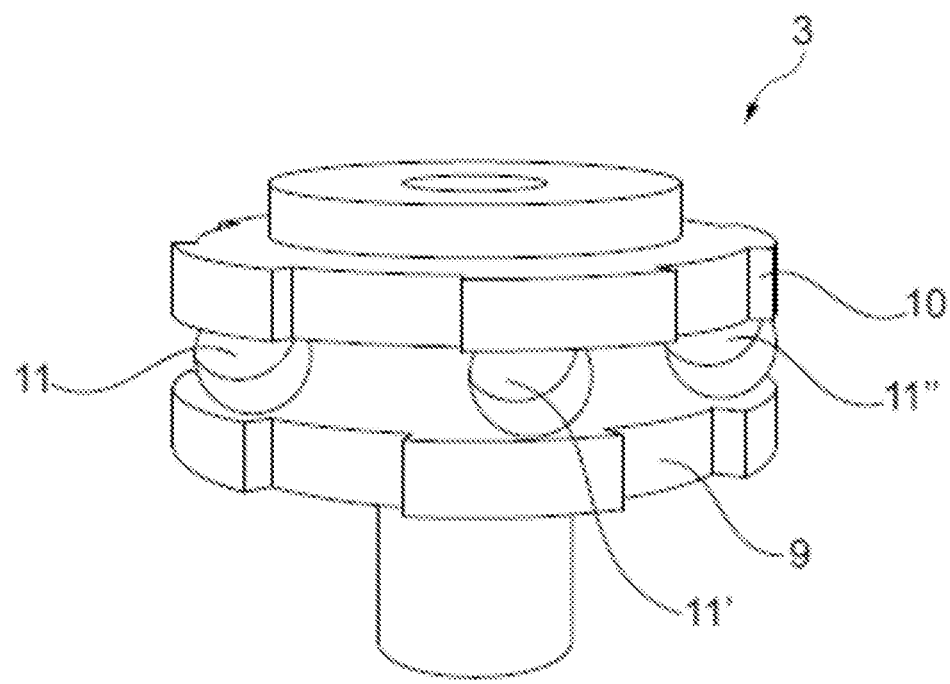
Figure 7:
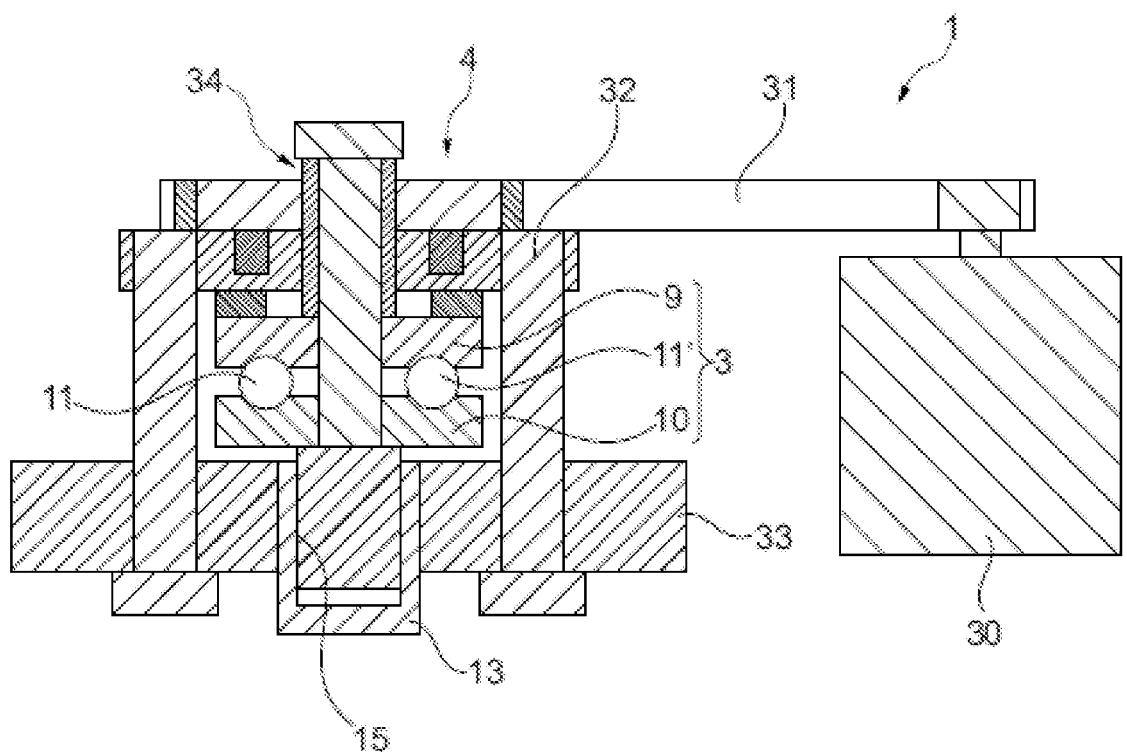
Figure 8:
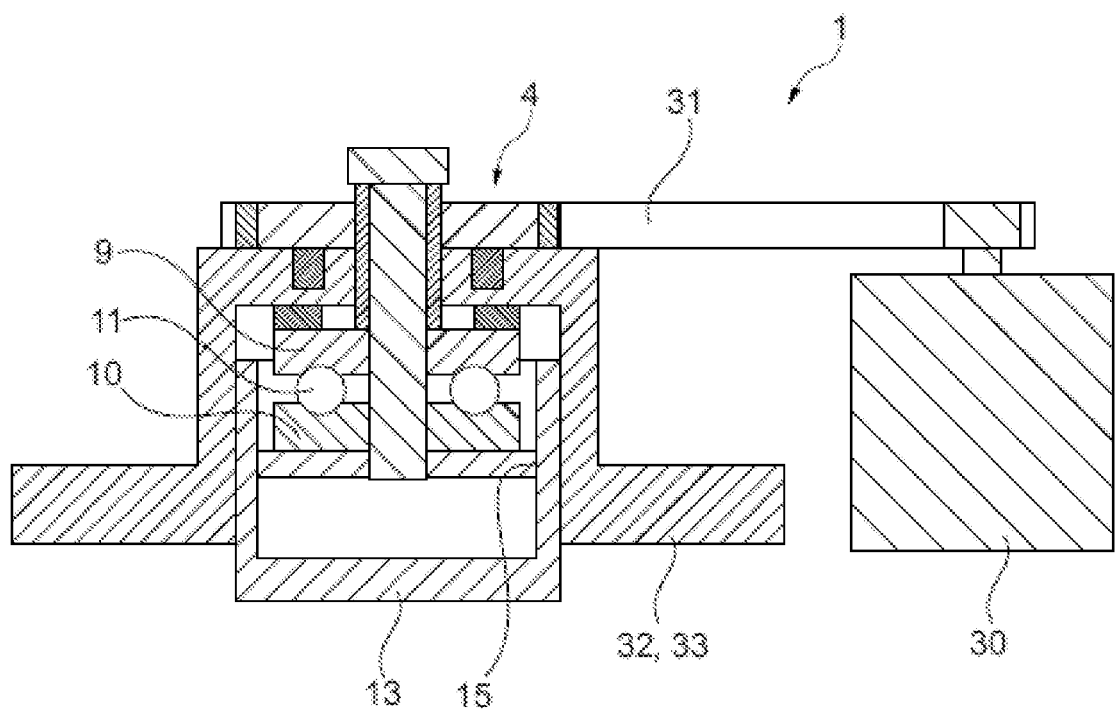

FIG. 1 shows a cross-sectional view of a friction brake system for a vehicle, FIG. 2 shows a perspective view of a gear module of the friction brake system, FIG. 3 shows an exploded view of a ball-in-ramp assembly of the friction brake system, FIG. 4 shows a perspective view of a first plate of the ball-in-ramp assembly, FIG. 5(*a*) shows a schematic view of grooves of the first plate and of a second plate of the ball-in-ramp assembly, FIG. 5(*b*) shows a schematic sectionals view of a groove of the first plate and a ball, FIG. 6 shows a perspective view of the ball-in-ramp assembly, FIG. 7 shows a schematic view of a friction brake system according to a second embodiment, and FIG. 8 shows a schematic view of a friction brake system according to a third embodiment.

FIG. 1 shows a cross-sectional view of a friction brake system 1 for a vehicle with a non-linear non-concentric ball in-ramp-mechanism. The friction brake system 1 comprises a housing 18. Enclosed within the housing 18 are a motor (not shown) and a transmission unit 2 comprising a ball-in-ramp assembly 3 and a planetary gear 4. The friction brake system 1 can be a part of a parking brake or of a service brake of the vehicle. To provide braking force, the motor is configured to drive a sun gear 5 via an outer cage 6 rigidly connected with the sun gear 5, e.g., using a toothed belt drive (not shown). The rotational motion is transmitted to a ring gear 7 via a set of planet gears 8, 8'. The ring gear 7 is rigidly connected with a first plate 9 of the ball-in-ramp assembly 3. The ball-in-ramp assembly 3 further comprises a second plate 10 and a set of five balls 11, 11' guided within grooves of the first plate 9 and of the second plate 10 of the ball-in-ramp assembly 3. The ball-in-ramp assembly 3 converts a rotational motion of the first plate 9 into a translational motion of the second plate 10 with respect to the first plate 9. When the brake is applied, a spacing between the first plate 9 and the second plate 10 increases.

The translational motion of the first and second plates 9, 10 is transmitted to a braking member 12 having braking bolts 13, 13' and a caliper housing bolt 14. The caliper housing bolt 14 is connected with a caliper housing (not shown). The caliper housing and the braking bolts 13, 13' are each connected with a brake pad (not shown) that may be pressed against friction surfaces on two opposing sides of a brake disk of a wheel brake. The braking bolts 13, 13' and the caliper housing bolt 14 are each provided with threads 15, 15', 15" for pad wear adjustment.

The first plate 9 of the ball-in-ramp assembly 3 is supported on a braking bolt bracket 16 by an axial needle bearing 17 which allows for a smooth rotational motion of the first plate 9 with respect to the braking bolt bracket 16. The braking bolt bracket 16 is rigidly connected with the braking bolts 13, 13'. The second plate 10 of the ball-in-ramp assembly 3 is rigidly connected to the caliper housing bolt 14. When the brake is applied, an axial spacing between the first and second plates 9, 10 increases and the braking bolts 13, 13' and the caliper housing move axially such that the brake disk is clamped by the brake pads of the braking bolts 13, 13' and of the caliper housing. A releasable unidirectional locking device 19, e.g., a freewheel mechanism, is arranged between the electric motor and the transmission unit so that a self-locking effect of the freewheel mechanism prevents or impedes rotation in a first rotational direction. The locking device 19 may also be configured to cancel the self-locking effect when an input rotation of the transmission unit in a second rotational direction is driven by the electric motor.

FIG. 2 shows a gear module 20 of the friction brake system 1. Corresponding and reoccurring features shown in the different figures are denoted using the same reference numerals. The gear module 20 can be pre-assembled and comprises an eco-lock 21, the set of planet gears 8, 8', the ball-in-ramp assembly 3 with the first plate 9, the second plate 10, and the set of balls 11, 11', 11", as well as the braking bolts 13, 13' or actuation pins. In some embodiments, more than two braking bolts 13, 13' are provided.

The ball-in-ramp assembly 3 is shown in more detail in FIG. 3. Each of the five balls 11, 11' is retained between grooves of the first plate 9 and grooves 22, 22' of the second plate 10. The axial needle bearing 17 is shown to be arranged underneath the first plate 9. FIG. 4 shows the grooves 23, 23' of the first plate 9. The grooves 23, 23' of the first plate 9 and the grooves 23, 23' of the second plate 10 are identical in shape. Each of the balls 11 is held and retained by a pair of grooves comprising one of the grooves 23 of the first plate 9 and one of the grooves 22 of the second plate 10. The grooves 22, 22', 23, 23' each have an outer portion 24 and an inner portion 25. Before the brake is applied, the balls 11 are held in the outer portions 24 of the pairs of grooves 22, 23. Upon actuation of the brake, the balls 11 roll within the grooves toward the inner portions 25. The grooves are shaped such that neighbouring grooves have a circumferential overlap, i.e., in one circumferential position 26, an inner portion 25 of a groove 23 overlaps with an outer portion 24' of a neighbouring groove 23'.

FIG. 5(a) schematically illustrates the spatial relation of the grooves of the first and the second plate 9, 10. Shown is a groove 23 of the first plate 9, which defines a path 27, i.e., a line of longitudinal extension of the groove 23. Further, a groove 22 of the second plate 10 is shown using a dashed line defining another path 28. The ball 11 is held and guided by the grooves 22, 23 such that the ball 11 is positioned at an intersection point 29 defined by a crossing of the paths 27, 28.

FIG. 5(b) shows a schematic view of the groove 23 and the ball 11 in a section along the path 27. A depth of the groove 23 is seen to decrease from the outer portion 24 of the groove 23 (holding the ball 11 when the brake is not applied) toward the inner portion 25 (holding the ball 11 when the brake is applied). The depth of the groove 23 increases in a non-linear manner such that it is steeper in the outer portion 24 than in the inner portion 25 of the groove 23.

A perspective view of the ball-in-ramp assembly 3 comprising the first plate 9, the second plate 10, and the balls 11, 11', 11" is depicted in FIG. 6.

FIGS. 7 and 8 show the friction brake system 1 according to further embodiments. In the embodiment of FIG. 7, the electric motor 30 is connected with the planetary gear 4 via a toothed belt 31. As it was described with regard to the previous embodiments, the motor 30 drives a rotational motion of the first plate 9 of the ball-in-ramp assembly 3. The rotational motion of the first plate 9 is again transformed into a translational motion of the second plate 10 with respect to the first plate 9. In this embodiment, the first plate 9 is arranged closer to the planet gear 4 than the second plate 10. The second plate 10 is configured to transmit a translational motion to the braking bolt 13 for braking. The first plate 9 is configured to transmit a translational motion to a fixture 32 via the needle bearing 17. The fixture 32 is rigidly connected with the caliper housing 33. In addition, a thread 15 for pad wear adjustment as well as a pad wear single incremental adjustment device 34 are shown. The embodiment of FIG. 8 corresponds to the embodiment of FIG. 7. However, in this embodiment the caliper housing 33 and the fixture 32 are formed as a single one-piece part. The braking bolt 13 is slidably received within the one-piece part and encloses the first plate 9.

According to the present invention, the position of the balls may be deter-mined by the fixed relation between a radial position and an actuation angle, as the ball keeps its relative position at the intersecting point of the ramps. Further, the present disclosure relates to an actuator for an electro mechanically actuated wheel brake consisting of a motor, a rotation/rotation gear and a rotation/translation gear. The rotation/translation gear may be a ball-in-ramp gear. The non-linear shaped ramps may be non-concentrically arranged on the ramp discs. Further, both ramp discs of the ball-in-ramp gear may be identically shaped and a first ramp disc may be stationary fixed with a fixture. A second ramp disc may be drivable by the rotation/rotation gear, which can be actuated by the motor. In addition, one side of the ramp disc may be prepared to be used as a bear ring of an axial bearing. Further, the fixture may on one side be prepared to carry the rotation/rotation gear and on the other side be prepared to be fixed to the caliper housing. The rotation/rotation gear may be linked with a releasable unidirectional locking device. Further, the axial needle bearing may be pushing a push device, which transfers the linear movement/force to a brake pad. In addition, both ramp discs of the ball-in-ramp gear may be identically shaped. Further, a first ramp disc may be connected with a push device. A second ramp disc may be connected with an axial needle bearing to a fixture. The push device may be connected to the pads with one or two or even more actuation pins. Further, the actuation pins may be part of a pad wear adjuster. The friction brake system may be designed for axial forces up to 65 kN. A stroke achieved using the system may be, e.g., 2 mm.

Features of the different embodiments which are merely disclosed in the exemplary embodiments may be combined with one another and may also be claimed individually.

What is claimed is:

1. A friction brake system for a vehicle, comprising
   a braking member connectable to first and second brake pads and configured for pressing the first and second brake pads against a friction surface, and
   a transmission unit configured for converting a rotary motion generated by an electric motor into a braking motion of the braking member,
   wherein the transmission unit comprises a ball-in-ramp assembly having:
   a first plate with at least one groove,
   a second plate with at least one groove facing the groove of the first plate, and
   at least one ball arranged between the first plate and the second plate, wherein the ball is retained by the groove of the first plate and the groove of the second plate;
   wherein the ball-in-ramp assembly is configured to convert a rotary motion of the first plate into a translational motion of the second plate with respect to the first plate,
   wherein the first plate is configured to be rotated by the electric motor and at least one of the first plate and the second plate is mechanically coupled with the braking member such that a rotation of the first plate causes the braking motion of the braking member, and
   wherein the first plate is rotatably supported by a brake bolt bracket coupled to at least one braking bolt, and the second plate is operably connected to a caliper housing bolt connected with a caliper housing such that the caliper housing and the braking bolt are configured to press the first and second brake pads against opposing surfaces of a brake disc when the braking member executes the braking motion, and
   wherein the second plate is connected to the caliper housing bolt through a hole formed in the first plate.

2. The friction brake system of claim 1, wherein the grooves of the first plate and the grooves of the second plate have an identical shape at least in sections.

3. The friction brake system of claim 1, further comprising a planetary gear, wherein the first plate is configured to be rotated by the electric motor via the planetary gear.

4. The friction brake system of claim 1, wherein the ball-in-ramp assembly comprises at least three grooves of the first plate, at least three grooves of the second plate, and at least three balls retained by pairs of the grooves of the first and second plates.

5. The friction brake system of claim 1, wherein the ball-in-ramp assembly comprises at least five grooves of the first plate, at least five grooves of the second plate, and at least five balls retained by pairs of the grooves of the first and second plates.

6. The friction brake system of claim 1, further comprising a housing, wherein the second plate is held such that it is not rotatable with respect to the housing.

7. The friction brake system of claim 1, wherein the braking member comprises the caliper housing connectable to the first brake pad and the braking bolt connectable to the second brake pad, wherein the caliper housing and the braking bolt are each coupled with one of the first plate and the second plate such that the caliper housing and the braking bolt are configured to press the first and second brake pads against opposing surfaces of the brake disc when the braking member executes the braking motion.

8. The friction brake system of claim 7, further comprising a housing, wherein the caliper housing and the braking bolt are held such that they execute a translational motion with respect to the housing when the braking member executes the braking motion.

9. The friction brake system of claim 8, wherein the first plate is coupled with the caliper housing and the second plate is coupled with the braking bolt and/or wherein the first plate is coupled with the braking bolt and the second plate is coupled with the caliper housing.

10. The friction brake system of claim 1, further comprising an axial needle bearing, which supports the first plate.

11. A parking brake for a vehicle comprising the friction brake system of claim 1, wherein the friction brake system is configured to keep the vehicle motionless when parked by pushing at least one of the first and second brake pads against the friction surface.

12. A service brake for a vehicle, comprising the friction brake system of claim 1, wherein the friction brake system is configured to reduce a rotational speed of a wheel by pushing at least one of the first and second brake pads against the friction surface.

13. The friction brake system of claim 1, wherein the depth of the groove of at least one of the first plate and the second plate gradually increases from the second portion, which is one end portion of the groove, to the first portion, which is another end portion of the groove.

14. The friction brake system of claim 1, wherein:
   the at least one braking bolt comprises two braking bolts, and
   the caliper housing bolt connected to the second plate is positioned between the two braking bolts coupled to the brake bolt bracket rotatably supporting the first plate.

* * * * *